(12) United States Patent
Bager et al.

(10) Patent No.: US 8,872,069 B2
(45) Date of Patent: Oct. 28, 2014

(54) METHOD OF PROVIDING A LASER WELDED PRODUCT AND A LASER WELDED PRODUCT

(75) Inventors: Kim Bager, Lyngby (DK); Carsten Thirstrup, Charlottenlund (DK)

(73) Assignee: Coloplast A/S, Humlebaek (DK)

( * ) Notice: Subject to any disclaimer, the term of this patent is extended or adjusted under 35 U.S.C. 154(b) by 1956 days.

(21) Appl. No.: 11/578,366

(22) PCT Filed: Apr. 13, 2005

(86) PCT No.: PCT/DK2005/000252
§ 371 (c)(1),
(2), (4) Date: Jan. 4, 2008

(87) PCT Pub. No.: WO2005/100000
PCT Pub. Date: Oct. 27, 2005

(65) Prior Publication Data
US 2008/0176023 A1    Jul. 24, 2008

Related U.S. Application Data

(63) Continuation of application No. 10/822,861, filed on Apr. 13, 2004, now abandoned.

(30) Foreign Application Priority Data

Apr. 13, 2004 (DK) .................. 2004 00585

(51) Int. Cl.
*B23K 26/00* (2014.01)
*B29C 65/00* (2006.01)
*B23K 26/18* (2006.01)
*B29C 65/16* (2006.01)
*B29L 31/00* (2006.01)

(52) U.S. Cl.
CPC ........... *B29C 66/532* (2013.01); *B29C 65/1635* (2013.01); *B29C 66/90* (2013.01); *B29C 65/1641* (2013.01); *B29L 2031/7148* (2013.01); *B29C 65/1677* (2013.01); *B29C 65/1616* (2013.01); *B29C 66/004* (2013.01); *B29C 66/9592* (2013.01); *B23K 26/18* (2013.01)
USPC ................................ 219/121.85; 219/121.63

(58) Field of Classification Search
USPC ............. 219/121.85, 121.64, 121.66, 121.63, 219/121.65
See application file for complete search history.

(56) References Cited

U.S. PATENT DOCUMENTS 4,388,135 A    6/1983   Jensen
4,879,450 A   11/1989   Valentin et al.
(Continued)

FOREIGN PATENT DOCUMENTS

DE    101 58 016 C1    1/2003
DE    44 32 081 A1     5/2005
(Continued)

OTHER PUBLICATIONS

BASF AG, "Transmission Laser-Welding of Thermoplastics", AWETA Thermoplaste, Ludwigshafen, XP-002312668, pp. 1-8, Feb. 1, 2000.

(Continued)

*Primary Examiner* — Sang Y Paik
(74) *Attorney, Agent, or Firm* — Coloplast Corp., Coloplast A/S; Nick Baumann

(57) ABSTRACT

A method of laser welding a layered product comprising two layers (44, 46) of a high absorption at the radiation wavelength, where one layer (44) is welded to a material (42) having a lower absorption and wherein a scattering layer (48) is provided between the laser welded layers (42, 44) and the other high absorption layer (48) in order to scatter any radiation penetrating the first high absorption layer (44) in order to prevent excessive heating of the other high absorption layer (46).

14 Claims, 2 Drawing Sheets

(56) References Cited

U.S. PATENT DOCUMENTS

| | | |
|---|---|---|
| 5,495,089 A * | 2/1996 | Freedman et al. ........ 219/121.64 |
| 5,702,771 A | 12/1997 | Shipston et al. |
| 6,029,280 A | 2/2000 | Sloot |
| 6,229,114 B1 | 5/2001 | Andrews et al. |
| 6,248,974 B1 | 6/2001 | Wai |
| 6,326,450 B1 | 12/2001 | Shipston et al. |
| 6,492,019 B1 | 12/2002 | Shipston et al. |
| 6,656,315 B2 | 12/2003 | Sallavanti et al. |
| 6,709,421 B1 * | 3/2004 | Falconer ........................ 604/335 |
| 6,749,933 B2 | 6/2004 | Dries et al. |
| 6,841,024 B2 | 1/2005 | Drummond et al. |
| 7,166,669 B2 | 1/2007 | Joachimi et al. |
| 7,201,963 B2 | 4/2007 | Hartley et al. |
| 7,955,859 B2 * | 6/2011 | Matsumoto et al. .......... 436/172 |
| 2004/0030384 A1 | 2/2004 | Wissman |
| 2004/0056006 A1 | 3/2004 | Jones et al. |
| 2004/0089640 A1 | 5/2004 | Bager et al. |
| 2004/0147887 A1 | 7/2004 | Hagstroem et al. |
| 2004/0150688 A1 | 8/2004 | Kwan et al. |
| 2004/0234899 A1 | 11/2004 | Toriumi et al. |
| 2005/0000641 A1 * | 1/2005 | Hartmann et al. ......... 156/272.8 |
| 2005/0008854 A1 | 1/2005 | Seeger et al. |

FOREIGN PATENT DOCUMENTS

| | | |
|---|---|---|
| EP | 0 454 377 A1 | 10/1991 |
| EP | 0 476 865 | 3/1992 |
| EP | 1 331 635 | 7/2003 |
| EP | 0 126 787 | 12/2005 |
| GB | 1 528 452 | 10/1978 |
| WO | WO 89/10231 | 11/1989 |
| WO | WO 00/20157 | 4/2000 |
| WO | WO 02/00144 A1 | 1/2002 |
| WO | 02/23962 | 3/2002 |
| WO | 03/007080 | 1/2003 |
| WO | 2005/070360 | 8/2005 |

OTHER PUBLICATIONS

Russek, et al., "Laser Beam Welding of Thermoplastics", Proceedings of SPIE—The International Society for Optical Engineering: Photon Processing in Microelectronics and Photonics II, vol. 4977, XP-002312700, pp. 458-472, 2003.

XP-002312667, "Laser Welding of Polymers Using High Power Diode Lasers", Bachmann et al, Proceedings of Spie, vol. 4637, pp. 505-.

* cited by examiner

METHOD OF PROVIDING A LASER WELDED PRODUCT AND A LASER WELDED PRODUCT

This is a nationalization of PCT/DK2005/000252 filed 13 Apr. 2005 and published in English, claiming the benefit of U.S. application Ser. No. 10/822,861 filed 13 Apr. 2004.

The present method relates to the providing of a laser welded product in which the radiation from the laser is prevented from reaching an absorbing layer other than that being laser welded, by providing a scattering material between the two absorbing elements.

This is particularly interesting in layered products in which one of the elements being laser welded is attached to another absorbing element which might be adversely affected by radiation not absorbed in the laser welded layers.

One type of product where this may be the case is in ostomy bags in which it is desired to actually first provide the bag envelope comprising two layers attached to each other at at least one point and where an element is to subsequently be laser welded to one of the layers without affecting the other layer.

The use of radiation for performing or triggering different processes may e.g. be seen in: GB 1528452, U.S. Pat. No. 5,702,771, U.S. Pat. No. 6,326,450, U.S. Pat. No. 6,492,019, U.S. Pat. No. 6,248,974, U.S. Pat. No. 6,229,114, WO 02/23962, EP 1331635, EP 0476865, EP 0126787, WO 00/20157, WO 03/007080, and DE 101 58 016 as well as in Russek U A et al: "laser beam welding of thermoplastics, Proc. SPIE—the international society for optical engineering: photon processing in microelectronics and photonics II: San Jose, Calif., USA, Jan. 27-30 2003, vol. 4977, 2003, pages 458-472, Bachmann F G: "laser welding of polymers using high-power diode lasers", Proc of SPIE, vol. 4637, 2002, p: 505-518, and "laserstrahlschweissen von Thermoplasten in Durchstrahl-verfahren" 1 Feb. 2000, BASF AG, AWETA THERMOPLASTE, Ludwigshafen, Del.

In a first aspect, the invention relates to a method of welding a first and a second element to each other by transmitting radiation in a predetermined direction to an interface between the two elements, the method comprising:

1. providing the first element having, in the direction, a first layer and a second layer attached to each other, the first layer having a first absorption coefficient, $\mu a1 > 0.4$ mm$^{-1}$, at a wavelength of the radiation and the second layer having a second absorption coefficient, $\mu a2 > 0.1$ mm$^{-1}$ at the wavelength,
2. providing the second element with, in the direction, a third absorption coefficient, $\mu a3$, at the wavelength, the third absorption coefficient being lower than the first and second absorption coefficients,
3. positioning the second element so as to abut or be proximate to the first layer and so that the radiation penetrates the second element, along the direction, before penetrating into the first layer,
4. providing a third layer having a scattering coefficient, $\mu s > 0.4$ mm$^{-1}$, at the wavelength, between the first and second layers, in the direction of the radiation, and
5. providing radiation along the direction, the radiation:
   penetrating the second element,
   heating the first layer so as to weld the first layer to the second element, and
   radiation having penetrated the first layer being scattered by the third layer.

In the present context, the first and second layers of the first element may be two individual layers attached to each other at at least one point, such as by welding (laser welding or heat welding, spot welding or the like), adhesion, ultrasonic welding, or high frequency welding, or they may be made of the same layer of material which is folded to generate the two layers.

During the heating step in which the first layer is welded to the second element, radiation transmitted through the first layer and the second element will be scattered by the third layer in a direction both toward the first layer and in other directions pointing away from the second layer. Thus, the intensity of radiation actually reaching the second layer is much smaller than the intensity reaching the third layer.

The direction from which the radiation is transmitted toward the elements normally is a direction at least substantially perpendicular to a general plane of the elements. This, however, is merely one manner of providing the radiation. The actual direction may be at any angle to the elements as long as the order of the elements in the direction of the radiation is correct.

In the present context, the scattering of the third layer may be provided in any suitable manner, such as by incorporating therein a powder or fibres facilitating the scattering or providing a surface of the third layer which facilitates the scattering. This surface may be uneven, such as sand blasted.

In general, the absorption coefficient of the second element is not important as long as it is not so large that the radiation heats the second element excessively or the second element absorbs too much of the radiation before it reaches the interface between the second element and the first layer.

On the other hand, $\mu a1$ may be larger than 0.6 mm$^{-1}$, such as larger than 1.0 mm$^{-1}$, preferably larger than 2.0 mm$^{-1}$, such as larger than 4.0 mm$^{-1}$, in order to ensure a sufficient absorption and heating of the first layer.

Also, $\mu a2$ may be larger than 0.4 mm$^{-1}$, such as larger than 1.0 mm$^{-1}$, preferably larger than 2.0 mm$^{-1}$, such as larger than 4.0 mm$^{-1}$, and may, naturally, be identical to $\mu a1$.

In the present context, the first layer and the second element abut or are proximate to each other so that upon heating of the first layer (whereby the material of the first layer may increase in volume), the two layers will touch and the first layer will also heat the second element in order to weld the two materials together.

In addition, the larger the scattering coefficient of the third layer, the more diffuse the radiation emitted from the third layer. Thus, $\mu s$ may be larger than 0.6 mm$^{-1}$, such as larger than 1.0 mm$^{-1}$, preferably larger than 2.0 mm$^{-1}$, such as larger than 4.0 mm$^{-1}$.

Naturally, in order to prevent the third layer from moving about before the laser welding, step 4. may comprise fixing the third layer to the first layer and/or the second layer. This fixing may be performed in any manner suitable, such as using adhesives, heat welding, or static electricity, or fixing the third layer in a process in which the first and second layers are fixed to each other.

In a preferred embodiment, step 5 comprises providing the radiation along the direction and in a predetermined first position or a predetermined first pattern of positions in a general plane defined by the first and second layers, the first and second layers being attached to each other in a predetermined second position or a predetermined second pattern of positions in the general plane, the first position(s) and the second position(s) being different. In this situation, the third layer preferably is present, in the general plane, in all of the first position(s) either as a single piece of material or as a number of different pieces of material.

Thus, in this embodiment, the first and second elements are laser welded to each other at the first position(s), which may be a continuous weld or spot welds (or a combination thereof), and the first and second layers are attached to each other at other position(s) than those of the laser welding. Naturally, these positions may be different in that the laser welding may be performed independently of this fixing.

In another embodiment, step 2 comprises providing the second element with a predetermined outer contour in a general plane of the first and second layers. An additional step, step 6, is included which comprises providing the radiation along the direction and in a predetermined first contour in the plane, the outer contour encircling, in the plane, at least part of the first contour. An example of a product of this type will be an ostomy bag wherein a connecting element is to be laser welded to a side of the pouch envelope and wherein the laser welding of the connecting element to the pouch envelope is in fact performed inside (in the plane) the contour of the attachment of the two layers forming the pouch envelope. Thus, in this manner, where it is ensured that the welding of the connecting element (the second element) to the one side (the first layer) of the pouch, the other side (the second layer) is not welded to the first side when the third layer is provided inside the pouch.

Thus, the pouch envelope may be provided (heat welded or the like) before actually heat welding the connecting element to the pouch. Naturally, this is independent of whether the connecting means operate using an adhesive or a mechanical coupling means.

In general, it is advantageous if step 1. comprises providing the second layer with at least a predetermined lowest melting temperature, and wherein step 5. comprises providing radiation with a predetermined intensity so that any radiation transmitted through the second element and heating the second layer does not have a sufficient intensity to heat the second layer to the predetermined lowest temperature. This may be a limitation of the radiation intensity transmitted to the first layer (but which then may present problems in the laser welding) or a requirement to the choice of material of the second layer or the scattering performed by the third layer.

Naturally, the same may be true for the third layer in that the third layer may touch or be adjacent to the second layer and thereby be heated thereby. Thus, preferably step 3. also comprises providing the third layer with at least a predetermined lowest melting temperature, and wherein step 5. comprises providing radiation with a predetermined intensity so that any radiation transmitted through the second element and heating the second layer does not have a sufficient intensity to heat the second layer to the predetermined lowest temperature.

In one embodiment, step 4 comprises providing a third layer with an absorption coefficient, $\mu a$, at the wavelength, where $\mu s > (1/10) * \mu a$. In this manner, the overall functionality of the third layer is the scattering and not absorption therein which would heat the third layer.

In another aspect, the invention relates to a method of welding a first and a second element to each other by transmitting radiation in a predetermined direction to an interface between the two elements, the method comprising:

1. providing the first element having, in the direction, a first layer and a second layer attached to each other, the first layer having a first absorption coefficient, $\mu a1$ at a wavelength of the radiation and the second layer having a second absorption coefficient, $\mu a2 > 0.1$ mm$^{-1}$ at the wavelength,
2. providing the second element with, in the direction, a third absorption coefficient, $\mu a3$, at the wavelength, $\mu a3 > \mu a1$ and $\mu a3 > 0.4$ mm$^{-1}$,
3. positioning the second element so as to abut or be proximate to the first layer and so that the radiation penetrates the first layer, along the direction, before penetrating into the second element,
4. providing a third layer having a scattering coefficient, $\mu s > 0.4$ mm$^{-1}$, at the wavelength, between the second element and the second layer, in the direction of the radiation, and
5. providing radiation along the direction, the radiation:
   penetrating the first layer,
   heating the second element so as to weld the first layer to the second element, and
   radiation having penetrated the second element being scattered by the third layer.

In this aspect, the roles and positions of the first layer and the second element have been interchanged. No other differences need be present. The first or second aspect may be selected depending on whether the first and second layers are desirably of the same material or made of the same layer of material or not, and whether the first layer has a sufficiently high absorption coefficient to facilitate laser welding or not.

Then, again, step 4. could comprise fixing the third layer to the first layer or the second layer.

Also, step 5. could comprise providing the radiation along the direction and in a predetermined first position or a predetermined first pattern of positions in a general plane of the first and second layers, the first and second layers being attached to each other in a predetermined second position or a predetermined second pattern of positions in the plane, the first position(s) and the second position(s) being different.

In addition, step 1. could comprise providing the first and second layers attached to each other along a first, predetermined outer contour in a general plane of the first and second layers, wherein step 2. comprises providing the second element with a predetermined first contour in the plane, the outer contour fully encircling the first contour, and wherein step 6. comprises providing the radiation along the direction and in the predetermined second outer contour in the plane.

Finally, step 1. could comprise providing the second layer with at least a predetermined lowest melting temperature, and wherein step 5. comprises providing radiation with a predetermined intensity so that any radiation transmitted through the second element a and heating the second layer does not have a sufficient intensity to heat the second layer to the predetermined lowest temperature.

A third aspect relates to a laser welded element comprising, in a predetermined direction, 1. a first element comprising a first layer and a second layer attached to each other, the first layer having a first absorption coefficient, $\mu a1 > 0.4$ mm$^{-1}$, at a wavelength of the radiation and the second layer having a second absorption coefficient, $\mu a2 > 0.1$ mm$^{-1}$ at the wavelength,
2. a second element with, in the direction, a third absorption coefficient, $\mu a3$, at the wavelength, the third absorption coefficient being lower than the first and second absorption coefficients, the second element being positioned so as to abut or be proximate to the first layer and so that the radiation penetrates the second element, along the direction, before penetrating into the first layer,
3. a third layer positioned between the first and second layers, in the direction of the radiation, and having a scattering coefficient, $\mu s > 0.4$ mm$^{-1}$, and wherein the first layer is welded to the second element, the third layer is attached to one of the first and second layers and is not attached to the other of the first and second element.

This laser welded element may be an ostomy bag comprising a pouch to which a connecting element is welded.

A fourth and final aspect of the invention relates to a laser welded element comprising, in a predetermined direction, 1. a first element comprising a first layer and a second layer attached to each other, the first layer having a first absorption coefficient, $\mu a1$, at a wavelength of the radiation and the second layer having a second absorption coefficient, $\mu a2 > 0.1$ mm$^{-1}$, at the wavelength,
2. a second element with, in the direction, a third absorption coefficient, $\mu a3 > \mu a1$ and $\mu a3 > 0.4$ mm$^{-1}$, at the wavelength, the second element being positioned so as to abut or be proximate to the first layer and so that the radiation penetrates the first layer, along the direction, before penetrating into the second element,
3. a third layer positioned between the second element and the second layer and having a scattering coefficient, $\mu s > 0.4$ mm$^{-1}$ in the direction of the radiation, and wherein the first layer is welded to the second element, the third layer is attached to one of the first and second layers and is not attached to the other of the first and second element.

As indicated above, the third and fourth aspect may be selected depending on the absorption coefficient of the first layer and whether it is desired to have certain characteristics in common (or different characteristics) in the first and second layers. As mentioned above, the third layer preferably has an absorption coefficient, pa, at the wavelength, where $\mu s > 0.4$ mm$^1$ and $\mu a < 4$ mm$^{-1}$.

The present element may e.g. be an ostomy bag in which a chamber for holding a gas filter is welded inside the pouch envelope.

In the following, preferred embodiments of the invention will be described with reference to the drawing, wherein.

Figure 1:
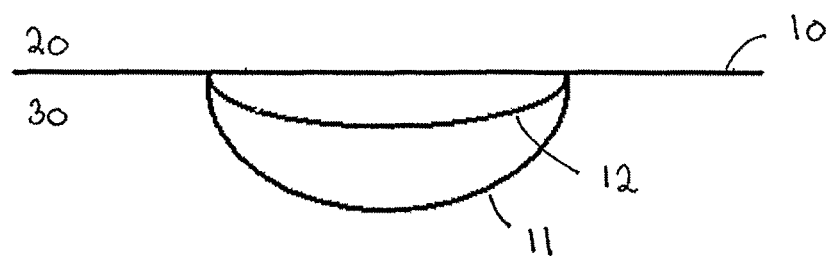
FIG. 1 illustrates laser welding of two parts.

FIG. 1 illustrates laser transmission welding of a transparent part 20 to an absorbing part 30. Laser light penetrates the upper transparent part 20 and is absorbed in the lower absorbing part 30 at an interface 10 between the two parts 20 and 30.

The absorption coefficient of the part 20 is preferably not too high in that this will cause absorption of radiation before reaching the interface where the radiation is desired. However, as long as the absorption of the part 20 does not damage this part, it may very well have both some absorption and scattering of the radiation.

Two lines, 11 and 12 are illustrated. These lines describe the penetration depth—or melted volume—of the radiation in two instances.

If the absorbing part 30 does not scatter laser light to any substantial degree, the light will penetrate to the depth illustrated by line 11.

If the absorbing part 30 also scatters laser light, the light penetration is reduced as illustrated by the line 12. This effect, naturally, is a gradual decrease of the penetration depth with the increase of scattering in the material 30.

The same total amount of energy is absorbed in the two cases implying that more energy is absorbed close to the interface 10 and hence a higher interface temperature is reached where scattering of laser light takes place in the material 30.

This effect may be used for decreasing the amount of absorber in the material 30. This may be desired in a number of applications where the colour of the materials 20 and 30 is of importance. It is difficult to find and incorporate absorbers in e.g. polymers, which absorbers have a sufficient absorption in e.g. the infrared region but only minor influence on absorption or reflection (colour) in the visible range.

Figure 2:
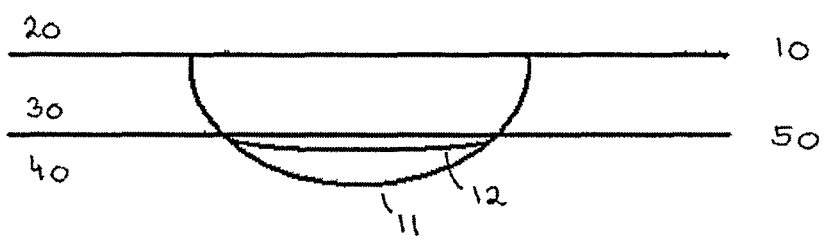
FIG. 2 illustrates laser welding of two parts having there between an absorbing layer.

In FIG. 1, the absorption and the scattering are both performed in the material 30 which may be homogeneous. These effects may, however, be separated. This is illustrated in FIG. 2, which illustrates laser transmission welding of three parts 20, 30 and 40.

In this situation, the function of the material 20 is the same, but the main absorption is now provided in the material 30, and two lines, 11 and 12, illustrate the penetration depth (melted volume) of the radiation when the material 40 has a sufficiently high scattering coefficient at the pertaining wavelength—or not. The material or part 40 need not have any absorption coefficient at the wavelength.

The parts 30 and 40 may be combined/attached into one part before welding or may form separate parts. Laser light penetrates the transparent part 20 and a part is absorbed in the absorbing part 30.

If the lower part 40 does not scatter laser light, the light will penetrate to the depth illustrated by line 11. If the lower part 40 also scatters laser light, the light penetration in 40 is reduced as illustrated by the line 12.

The same total amount of energy is absorbed in the two cases implying that more energy is absorbed in 30 and hence a higher interface temperature is reached at the interfaces 10, 50 when scattering of laser light takes place in 40.

It is seen that the material 30, in FIG. 2, may be used for attaching the materials 20 and 40 due to the even intensity distribution therein—and therefore the even temperature distribution which provides a good welding between the material 30 and each of the materials 20 and 40.

A test has been made with a set-up as seen in FIG. 1, and where the tensile strength of the weldings is tested.

Two types of materials are tested, where a first set of tests was made with a material 20 being the transparent material of the example below and the material 30 being the absorbing material of the below example. The thin line in FIG. 3 illustrates these tests.

In the second set of materials, the material 20 is again the transparent material of the example below and the material 30 is the absorbing and scattering material of the below example with a final TiO2 concentration of 2 wt. %. The fat line in FIG. 3 illustrates these tests. Thus, compared to the first set of materials, the material 30 contains an amount of TiO2 with a mean particle size of 300 nm that scatters the radiation.

The line energy (radiation intensity per distance—J/mm) was varied in order to see the effect on the intensity on the difference in scattering.

Figure 3:
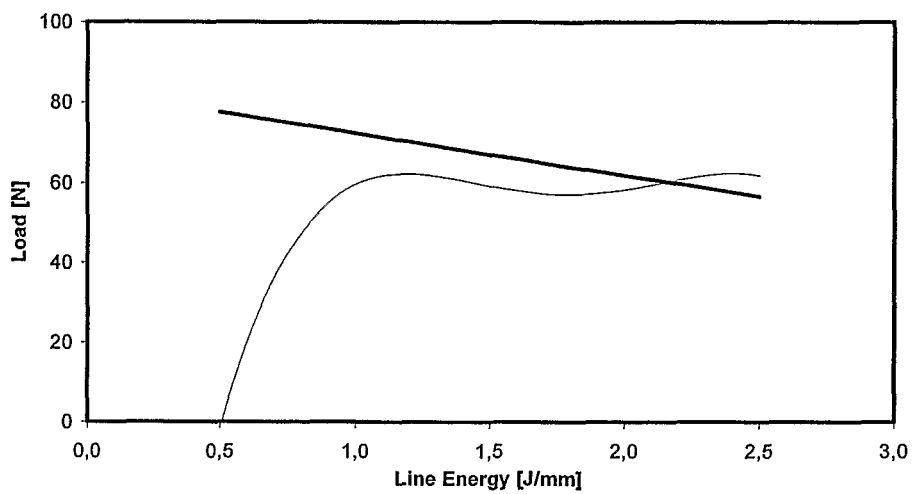
FIG. 3 illustrates peeling strength obtained in laser welding according to a preferred embodiment.

The results of FIG. 3 are quite clear in that it is seen that strong weldings are obtained at lower line energies when the material 30 comprises a higher scattering coefficient. This indicates that the scattering increases the radiation intensity at the interface so as to improve the weldings at lower energies.

At higher energies, it is seen by visual inspection of the samples that weldings with the first set of materials break due to breaking of the materials, where the weldings with the second set of materials peel, which indicates that the welds are the weak part and may have been made with a too high temperature.

Also, at high line energies, the material 30, in the first set of materials, is normally decolorized or damaged due to the large intensity absorbed through the material.

EXAMPLE

Three types of work pieces (49×49×1 mm^3) were made by injection moulding.

Transparent piece: Low-density polyethylene (LDPE, Engage 8401 from DuPont-Dow) or other types of polyethylene or polyethylene/ethylene-vinyl acetate co-polymers.

Absorbing piece: An amount of infrared absorber (PRO-JET 830 NP from Avecia) corresponding to a total final concentration of 0.02 wt. % was dissolved in a small amount of mineral oil and mixed with Engage 8401.

The PRO-JET 830 NP has a maximum absorption at a wavelength of 800 nm with a spectral full-width-half-maximum of ~110 nm and it can be readily mixed with polyethylene. At a concentration of 0.02 wt. % in polyethylene, the absorption coefficient ($\mu_a$) and scattering coefficient ($\mu_s$) at 800 nm are ~0.9 mm$^{-1}$ and ~0.3 mm$^{-1}$, respectively.

Infrared absorbers for laser welding of polymers should be mixable with the polymers and with a concentration resulting in sufficient absorption and scattering at the laser-welding wavelength. Commercial laser diodes for laser welding typically have emission wavelengths in the range from 800 nm to 980 nm. Infrared absorbers with sufficient absorption in this wavelength range can be selected from groups of nitroso, cyanine, nigrosine, triphenylmethane, imminium and diimminium, squaurilium and croconium, nickel dithiolenes and related compounds, quinone, phtalocyanine, azo, indoaniline, and others. The structural formulas of such compounds can be found e.g. in *Infrared Absorbing Dyes*" (*Topics in applied chemistry*), ed. M. Matsuoka, Plenum Press, New York, 1990. Such dyes may be modified in order to be mixable with the polymers to be welded or they may be produced in a pigmented form, which subsequently is mixed with the polymers. Methods of mixing dyes with polymers include coprecipitation of the dye with the polymers in a solvent or in high vacuum [see e.g. T. Hiraga et al. *"Properties and application of organic dye associates in polymer matrices", Thin Solid Films* 273 (1996) 190-194]. Alternatively, dye molecules may be covalently linked to the polymeric chains [see e.g. A. Costela et al. *"Efficient and highly photostable solid-state dye lasers based on modified dipyrromethene.BF$_2$ complexes incorporated into solid matrices of poly(methyl methacrylate), Appl. Phys. B* 76 (2003) 365-369].

Absorbing and scattering piece: A master batch containing 10 wt. % Pigment White 6 (untreated rutile TiO2 with a mean crystallite size of 300 nm such as PRETIOX R-200 M from PRECOLOR a.s.) in Engage 8401 was made by compounding. Various amounts of master batch were mixed with Engage 8401 and an amount of PROJET 830 NP dissolved in mineral oil corresponding to a total final concentration of 0.02 wt. %.

Laser welding experiments were performed using a diode laser with a wavelength of 808 nm, a beam diameter of 2 mm and various combinations of power and speed.

Tensile testing was performed on welded pieces. FIG. 3 shows the load at failure as a function of line energy defined as power/speed.

Measurement of the diffuse reflectance and total transmittance were made using an integrated sphere set-up as described e.g. by B. C. Wilson in 'Optical-Thermal Response of Laser-Irradiated Tissue', ed. A. J. Welch and M. J. C. van Gemert, Plenum Press NY 1995 chapter 8

The measured data were converted to absorption and scattering coefficients using the adding-doubling algorithm assuming isotropic scattering and an index of refraction of 1.5 (S. A. Prahl: "Optical property measurements using the inverse adding-doubling algorithm", Oregon Medical Laser Center, Portland Oreg., January 1999 http://omlc.ogi.edu/software/iad/index.html)

|  | $\mu_a$ (mm$^{-1}$) | $\mu_s$ (mm$^{-1}$) |
|---|---|---|
| LDPE | ~0.1 | ~0.1 |
| LDPE + absorber | 0.9 | 0.3 |
| LDPE + absorber + 0.25% TiO2 | 0.9 | 2.2 |
| LDPE + absorber + 0.5% TiO2 | 0.9 | 2.8 |
| LDPE + absorber + 1% TiO2 | 0.9 | 4.8 |
| LDPE + absorber + 2% TiO2 | 0.9 | 11.0 |

The table shows absorption and scattering coefficients measured on a number of different samples with and without absorber (PRO-JET 830 NP) and containing various amounts of TiO2.

Figure 4:
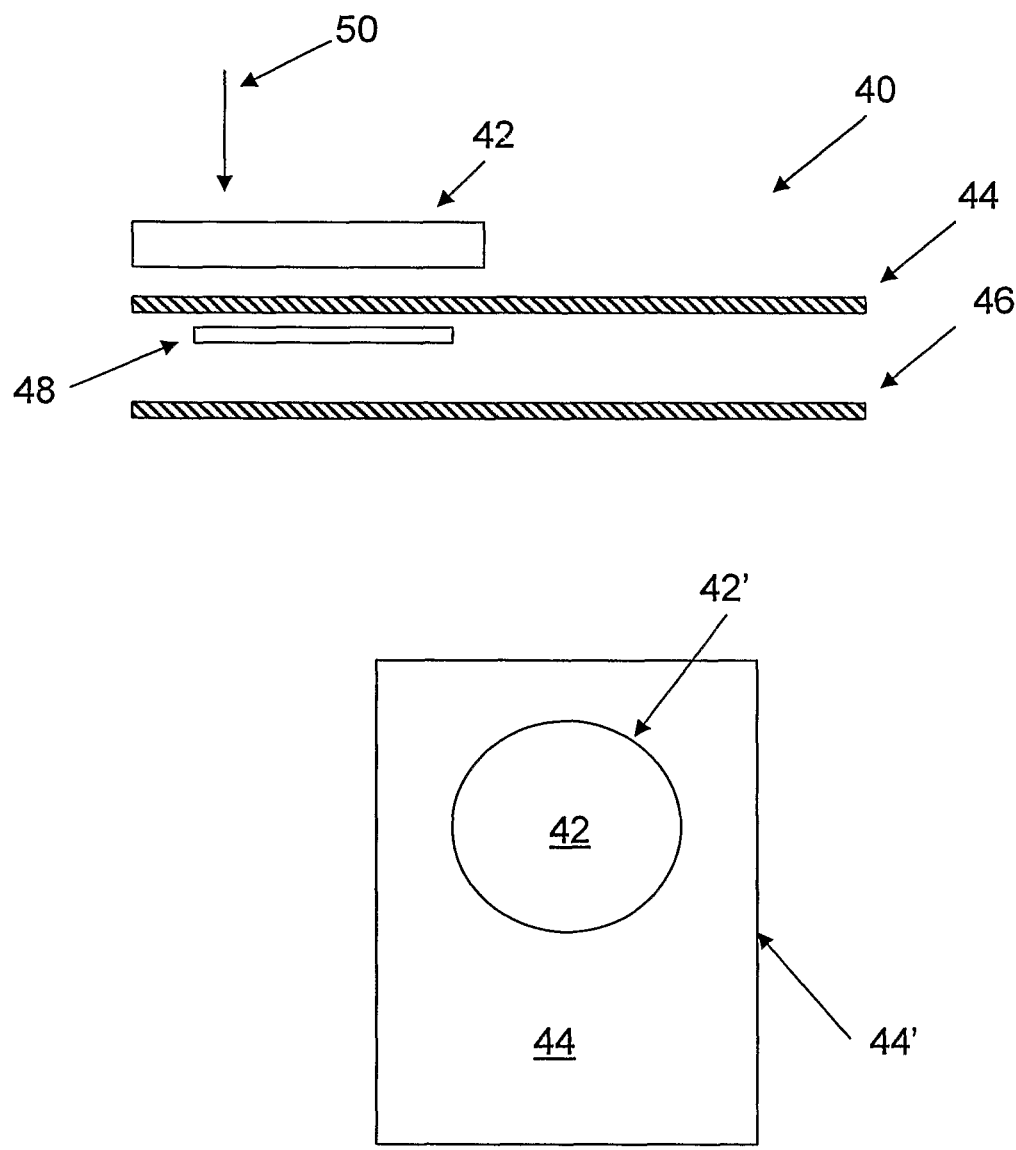
FIG. 4 illustrates a preferred method of the invention.

In FIG. 4, a preferred embodiment is illustrated in which an element 42, which is at least substantially transparent to a given wavelength, is to be laser welded to an element 44, which absorbs at the wavelength, using laser light 50 provided to the interface between the elements 42 and 44 at one or more predetermined positions.

The element 44 is attached to an element 46 also being absorbing at the wavelength, whereby providing the laser light 50 to the interface may result in sufficient laser light penetrating the element 44 and impinging on the element 46 thus heating the element 46. Thus, it may be obtained that the element 46 is actually laser welded to the element 44, which is not the intention.

The present elements 44 and 46 may be the two sides of a bag, such as an ostomy bag, which may be attached to one another along at least one of their adjoining edges, and the element 42 may be a coupling means to be attached to the bag in order to facilitate coupling of the bag to a mounting wafer or to a person. In the case of an ostomy bag, the element 46 is the front wall, or the side facing away from the ostomy user. The element 44 is the rear wall, or the side facing the ostomy user. The coupling element 42 is used to couple the bag to a mounting wafer (not shown) already adhered to the ostomy user or the user directly. As shown, the front and rear walls and the scattering layer are generally parallel with one another, with the scattering layer 48 between the front wall 46 and the rear wall 44, and the rear wall 44 between the scattering layer 48 and the coupling element 42.

Thus, in order to prevent excessive heating of the element 46, a layer 48 is provided between the elements 44 and 46. This layer 48 is adapted to scatter radiation at the wavelength so as to prevent it from (or at least reduce the intensity) reaching the element 46.

At the same time, it may be prevented or actually achieved that the element 48 is attached to the element 44 due to the fact that the element 44 is heated by the radiation and due to the fact that the scattering performed by the element 48 will reflect at least part of the radiation back toward and into the element 44 also facilitating heating at an interface between the elements 44 and 48.

It may be desired that the element 48 is not attached to any of the elements 44 or 46 and may move freely in relation to these, such as in the bag, if the elements 44 and 46 form part of a bag.

Alternatively, it may be desired that the element 48 is attached to one of the elements 44 or 46 in order to prevent it from moving away from the position in which it scatters the radiation.

It should be noted that the shape of the element 48 is preferably adapted to any pattern of providing the radiation 50 in order to obtain the desired welding.

As an alternative to the welding of the element 42 outside the element 44 (seen from the element 46), the element 42 may be provided between the elements 44 and 46, whereby the element 44 will then absorb little or no radiation at the wavelength and the element will have a sufficient absorption to facilitate welding.

Then, the element 48 will be positioned between the element 42 and the element 46. Again, the element 48 may be fixed to one of the elements 42 and 46 or may be freely movable in relation to these elements.

A product incorporating the latter structure may be an ostomy bag, where a space between the elements 42 and 44 may be used for holding a flatus filter provided for venting the bag.

FIG. 4 also illustrates the embodiment seen from the direction of the radiation 50. It is seen that the element 42, in a plane of the elements, has a contour 42' fully inside the outer contour 44' of the element 44 where the element 44 may be attached to or fixed to the element 46. Thus, in the present manner, if the elements 44 and 46 are attached to each other before laser welding the element 42 to the element 44, the elements 44 and 46 will not laser weld to each other due to the operation of the scattering element 48.

In the present embodiment, the elements 42, 44, 46, and 48 have been described and illustrated as thin sheet-like elements. Naturally, this is not required. Thicker elements may just as well be used. In addition, it is not required that the elements 44 and 46 are attached to each other along the full periphery. It suffices that they are attached at predetermined spots or points.

The invention claimed is:

1. A method of welding a coupling element to an ostomy bag by transmitting radiation in a predetermined direction at a given wavelength to an interface between the coupling element and the bag, the method comprising:
   providing an ostomy bag having a first layer, a second layer, and a third layer, the first layer and the second layer being attached to each other along their edges to form a pouch with the third layer positioned inside the pouch between the first and second layers, said third layer having a scattering coefficient, $\mu s > 0.4$ mm$^{-1}$, at the given wavelength, in the direction of the radiation, the first layer having a first absorption coefficient at the given wavelength of the radiation and the second layer having a second absorption coefficient at the given wavelength, said first absorption coefficient being larger than said second absorption coefficient;
   providing the coupling element with a third absorption coefficient in the predetermined direction at the given wavelength, the third absorption coefficient being less than the first and second absorption coefficients;
   positioning the coupling element so as to abut or be proximate to the first layer of the pouch and so that the radiation penetrates the coupling element, along the predetermined direction, before penetrating into the first layer; and
   providing radiation along the predetermined direction, said radiation penetrating the coupling element and heating the first layer of the pouch so as to weld the first layer to the coupling element, said radiation, having penetrated the first layer, being scattered by the third layer so that the first layer is not welded to the second layer of the bag.

2. The method as set forth in claim 1, wherein said third layer is fixed to one of said first layer and said second layer to prevent said third layer from moving about before welding.

3. The method as set forth in claim 1, wherein said third layer is not attached to either said first layer or said second layer and may move freely with relationship thereto.

4. The method as set forth in claim 1, wherein said first absorption coefficient of the first layer is $\mu a1 > 0.4$ mm$^{-1}$ at the given wavelength of the radiation, and the second absorption coefficient of the second layer is $\mu a2 > 0.1$ mm$^{-1}$ at the given wavelength of the radiation.

5. The method according to claim 1, wherein the step of providing the coupling element with a third absorption coefficient in the predetermined direction includes providing the coupling element with a predetermined outer contour, and said step of providing radiation along the predetermined direction includes providing said radiation in a predetermined first contour, the outer contour encircling at least part of the first contour.

6. The method according to claim 1, wherein the step of providing the third layer includes providing the third layer with a predetermined melting temperature, and said step of providing radiation includes providing radiation with a predetermined intensity so that any radiation transmitted through the coupling element and heating the second layer does not have a sufficient intensity to heat the second layer to the predetermined melting temperature.

7. The method according to claim 5, wherein the step of providing the third layer includes providing the third layer with a fourth absorption coefficient, $\mu a$, at the given wavelength, where $\mu s > (1/10) * \mu a$.

8. A method of welding a coupling element to an ostomy bag by transmitting radiation in a predetermined direction at a given wavelength to an interface between the coupling element and the bag, the method comprising:
   providing a front wall of an ostomy bag;
   providing a scattering layer adjacent and generally parallel with the front wall;
   providing a rear wall of the ostomy bag adjacent and generally parallel with said scattering layer so that said scattering layer is positioned in between said front wall and said rear wall;
   attaching the front wall and the rear wall together with the scattering layer located between the front and rear walls, the front and rear walls combining to form a pouch;
   placing a coupling element adjacent to the rear wall of the pouch so that the rear wall of the pouch is interposed in between the coupling element and the scattering element;
   directing radiation in the predetermined direction at the given wavelength through the coupling element to the rear wall of the pouch to weld the coupling element to the rear wall of the pouch, said radiation after penetrating said rear wall being scattered by said scattering layer so that said front wall of the pouch is not welded to said rear wall of the pouch.

9. The method as set forth in claim 8, wherein said scattering layer has a scattering coefficient of $\mu s > 0.4$ mm$^{-1}$ at the given wavelength in the direction of the radiation, the rear wall has a first absorption coefficient, $\mu a1$, at the given wavelength of the radiation and the front wall has a second absorption coefficient, $\mu a2$, at the given wavelength, said first absorption coefficient being larger than said second absorption coefficient.

10. The method as set forth in claim 9, further comprising providing the coupling element with a third absorption coefficient, $\mu a3$, in the predetermined direction at the given wavelength, the third absorption coefficient being less than the first and second absorption coefficients.

11. The method as set forth in claim 10, wherein said first absorption coefficient $\mu a1$ of the rear wall is greater than 0.4 mm$^{-1}$ at the given wavelength of the radiation, and the second absorption coefficient $\mu a2$ of the front wall is greater than 0.1 mm$^{-1}$ at the given wavelength of the radiation.

12. The method as set forth in claim 8, wherein said scattering layer is fixed to one of said front wall and said rear wall to prevent said scattering layer from moving about before welding.

13. The method as set forth in claim 8, wherein said scattering layer is not attached to either said front wall or said rear wall and may move freely with relationship thereto.

14. The method as set forth in claim 8, wherein said scattering layer is not attached to either said front wall or said rear wall and may move freely with relationship thereto inside the pouch.

* * * * *